United States Patent Office 3,192,048
Patented June 29, 1965

3,192,048
POWDERED EXTRACTS OF TEA LEAVES
Edwin Andrew Guthrie Liddiard, Stoke Poges, England, assignor to Fulmer Research Institute Limited
No Drawing. Filed Oct. 18, 1962, Ser. No. 231,574
Claims priority, application Great Britain, Oct. 18, 1961, 37,375/61
5 Claims. (Cl. 99—77)

This invention relates to a method of improving the flow properties of soluble powdered tea extracts adapted to be infused to provide beverages, and to methods of manufacturing such extracts.

Soluble powdered tea extracts adapted to be infused to provide beverages are usually manufactured by extracting soluble matter from prepared tea leaves with hot water, boiling water or steam, concentrating the resulting liquid extract, and finally preparing a powdered soluble solid from the concentrate by drying.

For use as a beverage the soluble powdered extract is simply dissolved in hot or cold water or other solvent.

Frequently, such soluble powdered tea extracts are put through filling or dispensing machines, an exact quantity of extract being caused to flow into a receptacle or cup for packing, tableting or vending. Manifestly it is necessary that the soluble powdered tea extract should flow easily and to attain this various addition agents have been proposed or adopted, but these may be viewed as adulterating the extract which can no longer be described as 100% pure.

A primary object of this invention is to provide soluble powdered tea extracts adapted to be infused to provide beverages, which extracts can properly be described as 100% pure extracts, run or flow freely, and can therefore be readily put through filling or dispensing machines.

The present invention is a method of manufacturing a soluble powdered tea extract adapted to be infused to provide a beverage, comprising extracting the soluble matter from prepared tea leaves with a member selected from the group consisting of hot water, boiling water and steam, concentrating the resulting liquid extract to a soluble powdered extract, calcining spent tea leaf resulting from the extraction, and adding ash resulting from the calcination to the soluble powdered tea extract in a weight ratio of from 0.1 to 3% of the extract.

According to the present invention we provide a soluble solid tea extract which includes ash resulting from the calcination of the residual spent tea leaf made available after extraction of the soluble matter therefrom, said ash being in a weight ratio of 0.1 to 3% of the extract.

Also, according to the present invention, a method of manufacturing a soluble powdered tea extract comprises extracting the soluble matter from prepared tea leaf with a member selected from the group consisting of hot water, boiling water and steam, concentrating the resulting liquid extract to a soluble powdered extract, calcining the spent tea leaf residue resulting from the extraction, and adding ash from this calcination to the soluble powdered tea extract in a weight ratio of from 0.1 to 3% of said extract.

The method of calcination of the spent tea leaf residue to produce the ash has not been found to be critical, and it may be advantageous to comminute the ash by ball milling or other means in order to produce the correct particle size and shape, but this is not considered to be essential so far as experiments have shown.

EXAMPLE

A soluble powdered tea extract was prepared by extracting the soluble matter from tea leaves with hot or boiling water, concentrating the resulting tea extract, and preparing the required powdered soluble solid from the concentrate by a low temperature vacuum process.

A sample of the tea extract was dried by heating to a temperature of 110° C. and the following four methods were used to determine properties therein specified:

(1) The flow rate of the sample was determined in accordance with A.S.T.M. Standard B213/48 "Standard Method of Test for Flow Rate of Metal Powders" (A.S.T.M. Standard 1961, part 3, page 1047).

(2) The sample was rotated in a cylindrical flat-bottomed glass container and measurement made of the angle taken up by the sample just before it collapsed.

(3) The sample was poured on to a flat surface and the angle of repose thereof was measured.

(4) The sample was filled into a shallow tray having in its bottom holes of $1/16''$ to $1/2''$ in steps of $1/16''$, and the largest diameter hole within this range blocked by the sample thus determined.

The results are shown in the table which follows comparatively with results similarly obtained by adding to the sample ash obtained from the spent tea leaves by calcining at 850° C. and sieving to pass a 100 mesh, the percentages of ash shown in the table being in terms of the weight of the sample.

Table

| Sample tested | Method | | | |
|---|---|---|---|---|
| | 1 | 2 | 3 | 4 |
| Tea extract dried at 110° C. | No flow | 60° | 50° | $1/2''$ hole blocked. |
| As above, but with 0.5% spent tea leaf ash added. | Immediate flow, time 5.1 seconds. | 50–55° | 50° | $1/4''$ hole blocked, $5/16''$ hole free. |
| As above, but with 1% spent tea leaf ash added. | Immediate flow, time 4.4 seconds. | 45° | 45° | $3/16''$ hole blocked $1/4''$ hole free. |
| As above, but with 2% spent tea leaf ash added. | Immediate flow, time 4.6 seconds. | 40° | 40° | All holes clear. |
| As above, but with 3% spent tea leaf ash added. | Immediate flow, time 4.6 seconds. | 40° | 40° | Do. |

A ten gm. sample of the dried tea powder containing 2% ash by weight of the sample was exposed to water vapour, and, as the powder absorbed water, the same tests were carried out. Up to 2% moisture content the flow from the cone was complete, the rotating angle of repose was 40°, the angle of repose was also 40°, and no holes were blocked in the tray test. Between 2% and 6% moisture pickup, the rotating angle of repose changed to 55° and the angle of repose to 50°, but there was no change in the flow from the cone or in the tray test. With from 6% to 8% moisture, particles were beginning to stick together, but again no difference was observed in the tests. At about 9% to 9½% moisture content, the cohesion of the tea particles was very marked. There was no free flow from the cone and gentle tapping was needed to clear it completely. The angle of repose remained at about 50–55° in both cases, but still no holes were blocked in the tray test.

The tests were repeated with a further sample of tea extract, and it was found that the addition of as little as 0.25% ash gave results equal to or rather better than the original test with .5% ash.

The weight of dried spent tea leaf is approximately twice the weight of the soluble solid extract produced, and the ash content of the burned spent tea leaf is approximately 2½%, so that up to 5% may be added to the soluble solid tea extract if required. However, as the foregoing tests have shown, very much less than this quantity is required to impart the desired free flowing characteristics, and the preferred ratio is from 0.1 to 3% ash in terms of weight of the extract.

The ash could, alternatively, be obtained from the calcination of like vegetable matter, for example the coarse leaf and stalk of the tea-plant, or so-called "refuse" tea or spent tea leaves from tea urns, which leaves are normally thrown away.

I claim:

1. A soluble solid tea extract which includes ash resulting from the calcination of the residual spent tea leaf made available after extraction of the soluble matter therefrom, said ash being in a weight ratio of 0.1 to 3% of the extract.

2. A method of manufacturing a soluble powdered tea extract, comprising extracting the soluble matter from prepared tea leaf with a member selected from the group consisting of hot water, boiling water and steam, concentrating the resulting liquid extract to a soluble powdered extract, calcining the spent tea leaf residue resulting from the extraction, and adding ash from this calcination to the soluble powdered tea extract in a weight ratio of from 0.1 to 3% of said extract.

3. A method of improving the flow properties of a soluble powdered tea extract adapted to be infused to provide a beverage and in the course of preparation of which the soluble matter is extracted from tea leaves leaving a residue, said method comprising adding to said powdered extract, in a weight ratio of from 0.1 to 3% of said extract, ash resulting from the calcination of said residue.

4. A method of manufacturing a soluble powdered tea extract adapted to be infused to provide a beverage, comprising extracting the soluble matter from prepared tea leaves with a member selected from the group consisting of hot water, boiling water and steam, concentrating the resulting liquid extract to a soluble solid powdered extract, calcining spent tea leaves resulting from the extraction, and adding ash resulting from the calcination to the soluble powdered tea extract in a weight ratio of from 0.1 to 5% of the extract.

5. A soluble solid tea extract which includes ash resulting from the calcination of the residual spent tea leaf made available after extraction of the soluble matter therefrom, said ash being in a weight ratio of 0.1 to 5% of the extract.

References Cited by the Examiner

UNITED STATES PATENTS

| | | | |
|---|---|---|---|
| 2,483,634 | 10/49 | Graham et al. | 99—78 X |
| 2,931,727 | 4/60 | Kraut | 99—71 |

FOREIGN PATENTS

| | | |
|---|---|---|
| 524,158 | 7/40 | Great Britain. |

A. LOUIS MONACELL, *Primary Examiner.*